US012581584B2

(12) United States Patent
Veig et al.

(10) Patent No.: US 12,581,584 B2
(45) Date of Patent: Mar. 17, 2026

(54) LIGHT SOURCE MONITORING

(71) Applicant: SEMICONDUCTOR COMPONENTS INDUSTRIES, LLC, Scottsdale, AZ (US)

(72) Inventors: Zvika Veig, Raanana (IL); Marko Mlinar, Horjul (SI); Guy Likver, Atlit (IL)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 239 days.

(21) Appl. No.: 18/426,522

(22) Filed: Jan. 30, 2024

(65) Prior Publication Data

US 2025/0247936 A1 Jul. 31, 2025

(51) Int. Cl.

| | |
|---|---|
| ***H05B 47/10*** | (2020.01) |
| ***H04N 23/12*** | (2023.01) |
| ***H04N 23/56*** | (2023.01) |
| ***H04N 25/768*** | (2023.01) |
| ***H05B 47/11*** | (2020.01) |
| ***H05B 47/20*** | (2020.01) |

(52) U.S. Cl.

CPC ............. *H05B 47/20* (2020.01); *H04N 23/12* (2023.01); *H04N 23/56* (2023.01); *H04N 25/768* (2023.01); *H05B 47/11* (2020.01)

(58) Field of Classification Search

CPC ........ H05B 47/10; H05B 47/11; H05B 47/20; H04N 23/12; H04N 23/56; H04N 25/768

See application file for complete search history.

(56) References Cited

U.S. PATENT DOCUMENTS

| | | | | |
|---|---|---|---|---|
| 2002/0113887 | A1* | 8/2002 | Iimura ................ | H04N 25/571 348/E3.018 |
| 2009/0040299 | A1 | 2/2009 | Harrison et al. | |
| 2010/0177929 | A1 | 7/2010 | Kurtz et al. | |
| 2018/0035087 | A1 | 2/2018 | Xu | |
| 2019/0124748 | A1 | 4/2019 | Dielacher et al. | |
| 2022/0291359 | A1 | 9/2022 | Tziony et al. | |
| 2022/0308169 | A1 | 9/2022 | Feru et al. | |

* cited by examiner

*Primary Examiner* — Jimmy T Vu

(57) ABSTRACT

A system such as an imaging system may include an illumination module. The illumination module may include a light source monitoring system. The light source monitoring system may sample a light source signal and aggregate the samples into data chunks. The light source monitoring system may selectively aggregate the data chunks to form groups of a monitoring time window. The light source monitoring system may detect a fault based on a value characterizing light source performance during the monitoring time window.

20 Claims, 4 Drawing Sheets

LIGHT SOURCE MONITORING

BACKGROUND

This relates generally to light source monitoring and more specifically to light source monitoring in imaging systems.

As an example, a time-of-flight (TOF) sensor for an imaging system can include an illumination module and a sensor module. The illumination module can include one or more light sources that emit light to illuminate an image scene. The emitted light reflects off of one or more objects and can be received by pixels in the sensor module to generate corresponding electrical charge. Based on the generated electrical charge, the sensor module can perform time-of-flight sensing calculations to determine depth and other scene information.

It may be desirable to monitor the operation of the illumination module to ensure that safety guidelines and/or requirements are satisfied.

DETAILED DESCRIPTION

Figure 1:
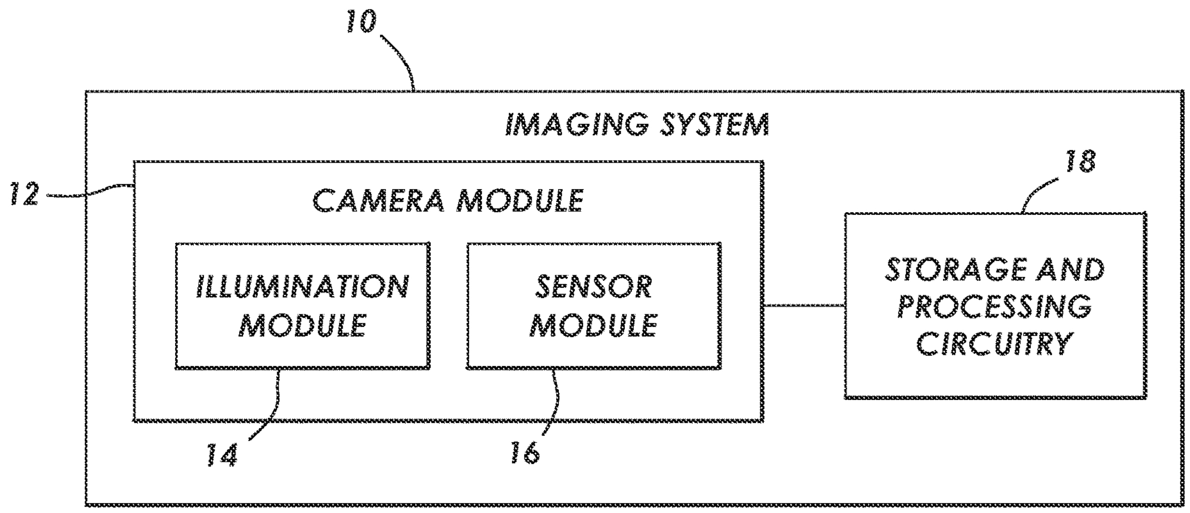
FIG. 1 is a diagram of an illustrative system having an illumination module in accordance with some embodiments.

Electronic systems may include an illumination module having one or more light sources that provide illumination such as infrared light illumination, visible light illumination, and/or light illumination at other wavelengths. The illumination module, if operating improperly, e.g., due to one or more system faults, may pose risks. As such, it may be desirable to monitor the operation of the illumination module. In some instances, the light source may be operated at high frequencies using a control signal with one or more frequencies between 30 MHz and 200 MHz and operated in different modes, which further increases the difficulty in sampling and monitoring the light source signal given the large number of samples required and the various desired sampling time windows associated with the different operating modes.

To monitor the operation of the illumination module and the light source(s) therein, the illumination module may include a light source monitoring system. The light source monitoring system may sample the state of a light source signal over time. The light source monitoring system may aggregate the sampled data into data values each associated with a chunk of data (sometimes referred to herein as a data chunk value) and may further aggregate multiple data chunk values into data values each associated with a group or grouping of data chunks (sometimes referred to herein as a data group value). In particular, the monitoring system may selectively generate the data chunk values each sized to average a desired number of samples and/or for a desired time period and may selectively generate a data group value to sum a desired number of suitably sized data chunk values to form a desired monitoring time window for a given monitor. The monitoring time window may be a rolling time window characterized by a rolling sum as the data group value, which is monitored. Multiple such monitors may be provided to analyze light source performance across a variety of monitoring time windows in parallel.

By providing monitoring for sampled data in different groupings of selected data chunks associated with different monitoring windows, the light source monitoring system may provide flexible and/or simultaneous monitoring for a variety of different operating modes. The use of different data chunks and different groupings of data may help condense the number of samples that are handled by the light source monitoring system, which can be especially helpful in real-time monitoring of high-frequency operations that are typically characterized by the processing of a relatively large number of data points over a small time period.

Configurations in which the illumination module forms part of an imaging system such as a time-of-flight (TOF) imaging system are sometimes described herein as an example. In some illustrative configurations, the imaging system may be part of an automotive system or vehicle, a digital camera, a computer, a cellular telephone, or another type of electronic system. The illumination module in the imaging system may assist in gathering light to capture one or more image frames that include information about the surrounding environment by illuminating the surrounding environment. The imaging system may have sensor circuitry including one or more arrays of image sensor pixels, which are sometimes referred to herein as sensor pixels or pixels. The active pixels in the array may include photosensitive elements such as photodiodes that convert the incoming light into electric charge. The array may have any number of pixels (e.g., hundreds or thousands or more). The sensor circuitry may include control circuitry such as circuitry for controlling the pixels and readout circuitry for reading out image signals corresponding to the electric charge generated by the photosensitive elements. If desired, the illumination module having the light source monitoring system may form part of other systems such as non-imaging systems.

FIG. 1 is a diagram of an illustrative system having an illumination module such imaging system 10 that uses sensor circuitry to capture images. Imaging system 10 of FIG. 1 may be a stand-alone camera, a cellular telephone, a tablet computer, a webcam, a video camera, a video surveillance system, an automotive imaging system, a video gaming system with imaging capabilities, an augmented reality and/or virtual reality system, an unmanned aerial vehicle system such as a drone, an industrial system, or any other desired imaging system or device that captures image data. Camera module 12, which is sometimes referred to as an imaging module, may be used to convert incoming light into digital image data. Camera module 12 may include one or more corresponding sensor modules 16, which are sometimes referred to as image sensor modules or image sensors. During image capture operations, light from a scene may be focused onto sensor module 16 by one or more corresponding lenses. Sensor module 16 may include circuitry for generating analog pixel image signals and circuitry for converting analog pixel image signals into corresponding digital image data, as examples. The digital image data may be provided to storage and processing circuitry 18.

Storage and processing circuitry 18 may include one or more integrated circuits such as digital signal processing circuits, image processing circuits, microprocessors, storage devices such as random-access memory and non-volatile memory, and/or other types of processing and/or memory circuitry. Storage and processing circuitry 18 may be implemented using components that are separate from camera module 12 and/or components that form part of camera module 12. When storage and processing circuitry 18 is implemented on different integrated circuits than those implementing camera module 12, the integrated circuits with circuitry 18 may be vertically stacked or packaged with the integrated circuits for camera module 12. Image data that has been captured by camera module 12 may be processed and stored using processing circuitry 18. As examples, the captured image data can be processed using an image processing engine on processing circuitry 18, using a digital signal processing engine on processing circuitry 18, using an imaging mode selection engine on processing circuitry 18, and/or using other portions of processing circuitry 18. The processed image data may, if desired, be provided to equipment external to camera module 12 and/or imaging system 10 such as a computer, an external display, and/or other devices using wired and/or wireless communications paths coupled to processing circuitry 18.

In some configurations described herein as an illustrative example, camera module 12 may implement a time-of-flight (TOF) sensor or camera. In these configurations, camera module 12 may include illumination module 14 configured to emit light for illuminating an image scene or more specifically one or more objects in the image scene. Sensor module 16 may be configured to gather reflected versions of the emitted light and to generate TOF information for the image scene such as depth or distance information for one or more of the objects, a depth or distance map of the image scene, a visible and/or infrared image of the image scene, and/or other TOF information.

Figure 2:
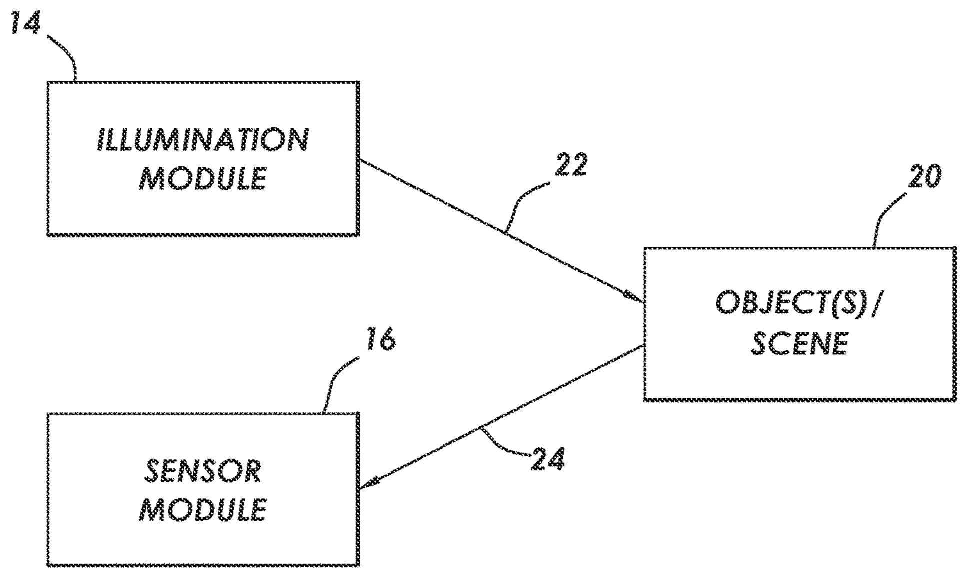
FIG. 2 is a diagram of illustrative illumination and sensor modules in accordance with some embodiments.

FIG. 2 is a diagram of illustrative illumination and sensor modules such as illumination and sensor modules in imaging module 12 of FIG. 1. As shown in FIG. 2, illumination module 14 may emit light, and sensor module 16 may receive the corresponding reflected light after the emitted light reflects off of one or more objects 20 or generally the image scene that contains object(s) 20. Illumination module 14 may include one or more light sources, which are sometimes referred to herein as light emitters or illumination devices. In the example of FIG. 2, the light source(s) emit light 22 that reaches one or more objects 20 and reflects off of one or more objects 20 as reflected light 24. Objects 20 may include any suitable objects, inanimate or animate, at different depths in the scene.

Reflected light 24 may be received at sensor module 16, or more specifically at one or more photosensitive elements in active image pixels of sensor module 16. Driver circuitry and/or control circuitry may control the pixels of sensor module 16 to generate one or more image frames based on reflected light 24 by providing control signals to transistors or other actuated elements in the pixels. In particular, based on the received control signals from the driver circuitry and/or control circuitry, the pixels may generate different portions of charge in response to reflected light 24 during integration or exposure time periods, may perform readout operations on the generated portions of charge during readout time periods, and/or may perform other suitable operations during other time periods.

In some illustrative arrangements described herein as an example, sensor module 16 may include a pixel array containing sensor pixels arranged in rows and columns. Pixel control circuitry may be coupled to lines (e.g., rows) of pixels in the array and pixel readout circuitry may be coupled to lines (e.g., columns) of pixels in the array. The pixel control circuitry may receive row and/or column addresses from timing control circuitry and supply corresponding row and/or column control signals such as reset, anti-blooming or global shutter, pixel select, modulation, storage, charge transfer, readout, and sample-and-hold control signals to the pixels over row and/or column control paths. One or more column and/or row readout paths may be coupled to each line of pixels in the array. These readout paths may be used for reading out image signals from the pixels and for supplying bias signals (e.g., bias currents or bias voltages) to the pixels. The pixel readout circuitry may receive image signals such as analog pixel values generated by the pixels and may include memory circuitry for storing calibration signals (e.g., reset level signals, reference level signals) and/or image signals (e.g., image level signals) read out from the array, amplifier circuitry or a multiplier circuit, analog to digital conversion (ADC) circuitry, bias circuitry, latch circuitry for selectively enabling or disabling different portions of the readout circuitry, or other circuitry that is coupled to one or more pixels in the array and/or for reading out image signals from the pixels. The readout circuitry may supply the resulting digital pixel data to control and processing circuitry 18 (FIG. 1) for further processing such as digital signal processing.

If desired, the pixel array may also be provided with a filter array having multiple color and/or infrared filter elements each overlapping the one or more pixels, thereby allowing a single image sensor to sample light of different colors or sets of wavelengths. In general, filter elements of any desired color and/or wavelength and in any desired pattern may be formed over any desired number of the image pixels. In the illustrative example of time-of-flight sensing using illumination module 14 in FIGS. 1 and 2, the pixel array may be provided with a correspond filter array that passes light having colors and/or frequencies emitted from illumination module 14.

Imaging module 12 in FIG. 1 may be configured to perform indirect TOF measurements based on phase differences between a modulated light signal, such as modulated light 22 emitted by illumination module 14 in FIG. 2, and the reflected modulated light signal, such as light 24 from the image scene received by sensor module 16 in FIG. 2. In these indirect TOF configurations, sensor module 16 may include an array of active pixels, each configured to (de) modulate the received light signal based on modulation control signals having a modulation frequency received at corresponding pixel transistors to separate photosensitive-element-generated charge into corresponding charge portions usable to generate TOF information.

Instead of or in addition to being configured to perform indirect TOF, image module 12 in FIG. 1 may be configured to perform direct TOF measurements in a pulsed mode. In direct TOF configurations, sensor module 16 may directly measure the time difference between when pulses of emitted light 22 are transmitted and when corresponding reflected versions of the pulses (e.g., pulses of reflected light 24) are received and detected by the array of active pixels in sensor module 16 to generate TOF information.

The TOF sensor described in connection with FIGS. 1 and 2 is merely illustrative. Illumination module 14 and sensor module 16 may each include other suitable circuitry such as power management and supply circuitry, processing circuitry, control circuitry, readout circuitry, timing circuitry, and/or clock generation circuitry. While illumination module 14 and sensor module 16 are shown as separate modules in FIGS. 1 and 2, this is merely illustrative. If desired, illumination module 14 and sensor module 16 may be coupled to and include shared circuitry in the camera module system such as shared power management and/or supply circuitry, shared modulation/demodulation circuitry, shared clock generation circuitry, a shared timing controller, shared signal generator circuitry, shared control circuitry, and/or shared storage circuitry.

In some illustrative arrangements, an illumination module may be provided separately from a sensor module, may be provided outside of an imaging module, and/or may be provided in other (non-imaging) systems.

Regardless of the types of systems or modules in which an illumination module is provided and/or the types of system or module with which the illumination module operates, it may be desirable to provide monitoring for the illumination module. This may help ensure that different types of faults in the illumination module are quickly and efficiently identified and/or the desired fault mitigation techniques may be performed to reduce possible harm to the surrounding environment.

Figure 3:
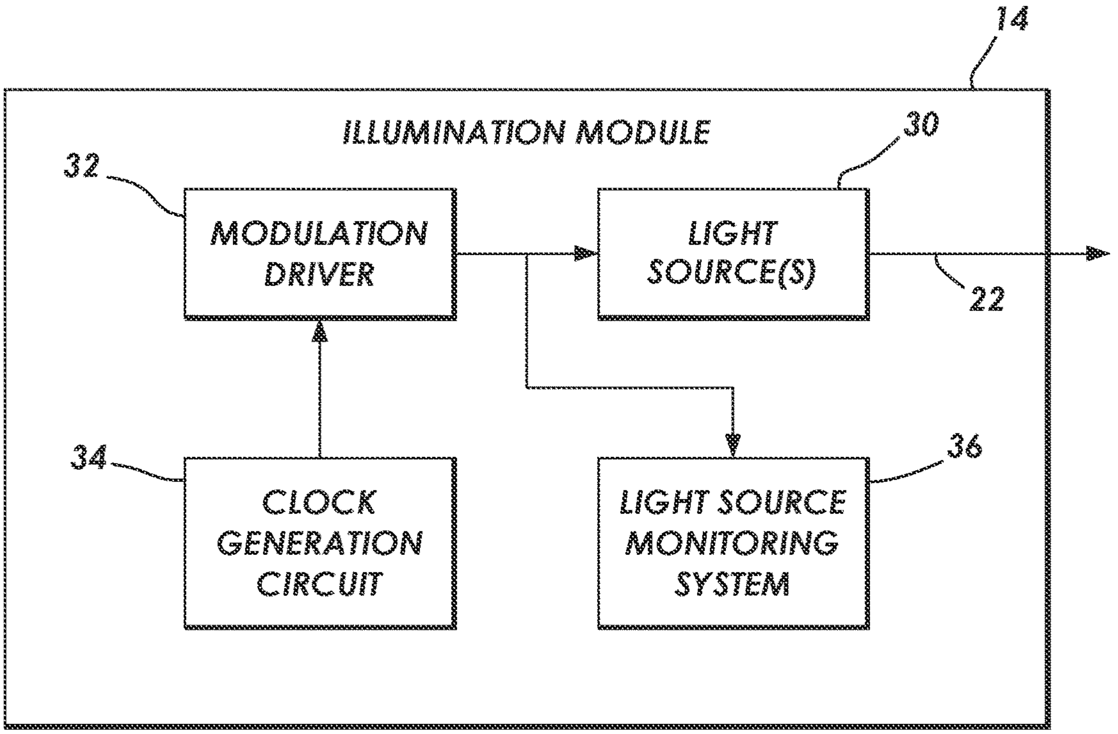
FIG. 3 is a diagram of an illustrative illumination module having a light source monitoring system in accordance with some embodiments.

FIG. 3 shows an illustrative illumination module containing a monitoring system. In the example of FIG. 3, an illumination module such as illumination module 14 in FIGS. 1 and 2 may include one or more light sources 30, a modulation driver 32 (sometimes referred to herein as driver circuitry or light source driver circuitry), a clock generation circuit 34, and a light source monitoring system 36.

Light sources 30 may include one or more lasers or laser diodes, one or more light emitting diodes (LEDs), and/or one or more other suitable types of light sources or illumination sources. Light sources 30 may emit light of any suitable wavelength such as visible light, infrared light, and/or light of other wavelengths.

Light sources 30 may be controlled and driven by the corresponding driver circuitry such as driver circuitry 32 coupled to each of light sources 30. Driver circuitry 32 may provide a drive signal (sometimes referred to as a control signal) having any suitable characteristics such as a suitable waveform, a suitable peak amplitude or power, a suitable periodicity or frequency, and/or other characteristics to each light source 30 to emit light 22 with corresponding desired characteristics. In some configurations described herein as an example, driver circuitry 32 may provide a drive signal having a high or low state at each phase of a clock signal with one or more frequencies between 30 MHz and 200 MHz. The drive signal may cause light source 30 to produce modulated light 22 having light pulses based on the high and low states of the drive signal.

As examples, the drive signal may be at high states during two consecutive time periods (clock phases) of the clock signal during which the light source 30 is active and emits light 22, may be at low states during two subsequent time periods (clock phases) of the clock signal during which the light source 30 is inactive and does not emit light 22, and/or may be at a high state then a low state during two subsequent time periods (clock phases) of the clock signal during which the light source 30 is active for the first clock phase and then inactive for the second clock phase. This sequence of high and low states of the driving signal is merely illustrative.

Driver circuitry 32 may be coupled to clock generation circuit 34. Clock generation circuit 34 may include a phase locked loop (PLL) that provides a clock signal to driver circuitry 32. Based on the clock signal, driver circuitry 32 may provide the corresponding drive signals to light sources 30.

To provide a (laser) light safety system, illumination module 14 may include light source monitoring system 36. To reduce the number of components needed to monitor the operation of illumination module 14 and/or to reduce disruption to the existing illumination module architecture, light source monitoring system 36 may be coupled to driver circuitry 32 and/or light sources 30 such that monitoring system 36 receives the drive signals provided from driver circuitry 32 to light sources 30. As an example, monitoring system 36 may be electrically connected to drive contact pads at driver circuitry 32 and/or at light sources 30 that convey the drive signals. In particular, monitoring system 36 may sample the drive signals over time to generate sampled data for monitoring.

If desired, instead of or in addition to sampling the drive signals, monitoring system 36 may sample other signals conveyed within illumination module 14, received by illumination module 14, and/or output by illumination module 14. In one illustrative arrangement, instead of or in addition to sampling the drive signals, monitoring system 36 may include one or more light detectors that sample the optical signals (e.g., light 22) to generate sampled data for monitoring. In general, any desired electrical and/or optical light source signal of the light source may be sampled for monitoring.

In some illustrative arrangements described herein as an example, the electrical and/or optical light source signals being sampled may be modulated with high frequency. Accordingly, a high number of samples may be generated over time. Additionally, in some applications such as TOF sensing, illumination module 14 may operate in different operating modules corresponding to different imaging modes (e.g., in conjunction with sensor module 16). As examples, illumination module 14 may emit light for different image exposure time periods, for different image frame depths, and/or for other modes of operation. Light emission may be monitored for each of these different operating modes and generally over various time intervals or monitoring time windows to properly characterize illumination module performance, determine whether operation in any of these modes has breached light emission limits, and/or determine whether different system faults have occurred. It may be difficult to effectively monitor illumination module performance, especially in these high-frequency multi-mode arrangements and in real-time. It would be advantageous to process data collectively.

Figure 4:
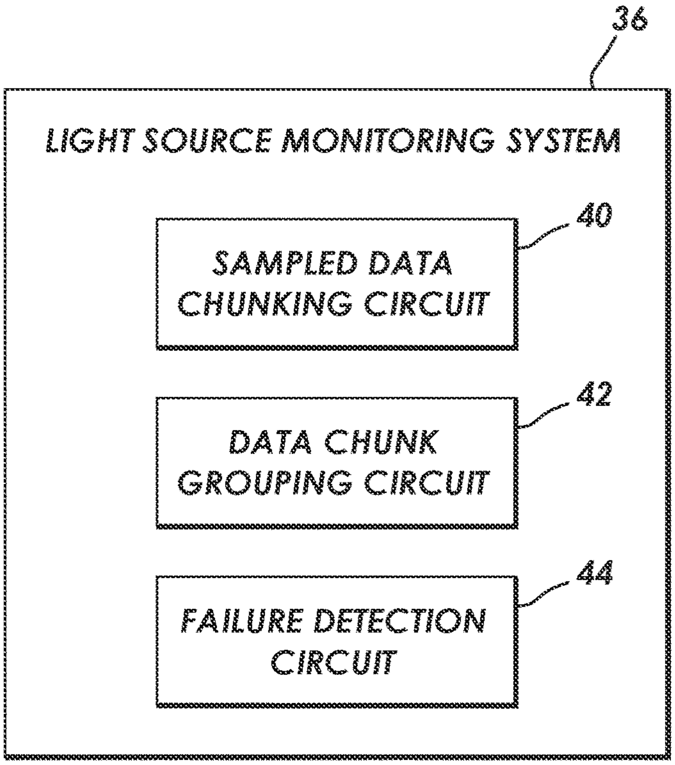
FIG. 4 is a diagram of an illustrative light source monitoring system in accordance with some embodiments.

FIG. 4 shows an illustrative light source monitoring system such as monitoring system 36 in FIG. 3 configured to monitor a light source signal based on data chunks and data groups. As shown in FIG. 4, light source monitoring system 36 may include data chunking circuit 40, data chunk grouping circuit 42, and failure (or fault) detection circuit 44.

In particular, data chunking circuit 40 may aggregate, organize, or otherwise process the data samples taken from the observed drive signal (or optical signal) into differently sized data chunks to produce corresponding data chunk values. In some configurations described herein as an illustrative example, the number of samples are represented by a bitstream of binary 0s and 1s, with each value of 0 or 1 being a sample. A value of 0 may be indicative of a time (period) at which the light source is inactive (does not produce light), whereas a value of 1 may be indicative of a time (period) at which the light source is active (produces light). The values of the bitstream may each correspond to or be indicative of a state of the drive or optical signal at a corresponding clock phase of the clock signal used to generate the drive signal provided to light source 30. For example, a high state of the signal may indicate that the light source is active, and a low state of the signal may indicate that the light source is inactive. When corresponding to the drive signal, the values of the bitstream may be detected by a digital counter in system 36 coupled to the signal path conveying the drive signal. When corresponding to the optical signal, the values of the bitstream may correspond to the detected on-off states of the light emitted by light source 30 and may be detected by a light detector in system 36.

A time period for a particular data chunk may include information from a desired number of samples such as one sample, two samples, three samples, four samples, eight samples, or any suitable number of data sample. In particular, data chunking circuit 40 may generate a data chunk value that is a value indicative of a number of time periods during which the light source is active within the time period for the data chunk. In other words, this data chunk value may correspond to a number of samples having the value of 1 within the time period.

Data chunking circuit 40 may also average the number of light source active time periods across multiple such data chunk time periods to generate additional averaged time chunk values for additional data chunks. In such a manner, these (averaged) time chunk values may include information from a greater number of samples such as 32 samples (when 8 four-sample values are averaged), 256 samples (when 64 four-sample values are averaged), 2048 samples (when 512 four-sample values are averaged), and/or other suitable numbers of samples.

Data chunking circuit 40 may produce, in parallel, multiple data chunk values associated with differently sized data chunks across the same time interval. As an illustrative example, over the same time period of 5,120 ns (nanoseconds), data chunking circuit 40, sampling the light source signal, may produce 512 10 ns-sized chunks, 64 80 ns-sized chunks, 8 640 ns-sized chunks, and/or 1 5120 ns-sized chunk. For each of the 512 10 ns-sized chunks, the data chunking circuit 40 may produce a first data chunk value indicative of the number of active light source time periods within that 10 ns time interval. For each of the 64 80 ns-sized chunks, the data chunking circuit 40 may produce a second data chunk value indicative of the number of active light source time periods within that 80 ns time interval. For each of the 8 640 ns-sized chunks, the data chunking circuit 40 may produce a third data chunk value indicative of the number of active light source time periods within that 640 ns time interval. For the single 5120 ns-sized chunk, the data chunking circuit 40 may produce a fourth data chunk value indicative of the number of active light source time periods within that 5120 ns time interval. In an illustrative configuration in which each 10 ns time interval contains 4 samples, each 10 ns-sized chunk may contain the information of 4 samples, each 80 ns-sized chunk may contain the information of 32 samples, each 640 ns-sized chunks may contain the information of 256 samples, and each 5120 ns-sized chunk may contain information of 2048 samples.

The sizes and/or durations of the data chunks as described above are merely illustrative. Any suitable sizes and/or durations of data chunks may be adjustable based on the implementation of the monitoring system.

Monitoring system 36 may further aggregate the differently sized data chunk values produced by data chunking circuit 40 to generate data group values each associated with a data group or grouping of data chunks. In particular, data chunk grouping circuit 42 in system 36 may receive each of the data chunk values associated with the differently sized data chunks from data chunking circuit 40. Data chunk grouping circuit 42 may use any suitable number of data chunk values associated with data chunks of the same desired size to generate a corresponding data group value. The number and/or size of data chunks used may be associated with and based on the size of the time window being monitored. Multiple such data group values may be constructed using varying numbers of data chunks and/or using data chunks of varying sizes to provide monitoring for a variety of monitoring time windows with the desired granularity. In other words, data chunk grouping circuit 42 may generate group values for multiple monitors in failure detection circuit 44.

In configurations described herein as an illustrative example, a data group value may be a sum of a suitable number of data chunk values and/or may be any other suitable type of aggregated value containing information about the multiple data chunk values. As some illustrative examples, data chunk grouping circuit 42 may receive multiple chunk values each associated with a 10 ns-sized data chunk and may sum 100 such chunk values to produce a group value for a 1-μs (microsecond) group time period, may sum 1000 such chunk values to produce a group value for a 10-μs group time period, and/or may sum any suitable number of such chunk values to produce a group value for a corresponding group time period of desired duration; data chunk grouping circuit 42 may receive multiple chunk values each associated with a 80 ns-sized data chunk and may sum 1000 such chunk values to produce a group value for a 80-μs group time period, may sum 4000 such chunk values to form a 320-μs group time period, and/or may sum any suitable number of such chunk values to produce a group value for a corresponding group time period of desired duration; data chunk grouping circuit 42 may receive multiple chunk values each associated with a 640 ns-sized data chunk and may sum 1000 such chunk values to produce a group value for a 640-μs group time period, may sum 4000 such chunk values to produce a group value for a 2560-μs group time period, and/or may sum any suitable number of such chunk values to produce a group value for a corresponding group time period of desired duration; and/or data chunk grouping circuit 42 may receive multiple chunk values each associated with a 5120 ns-sized data chunk and may sum 1000 such chunk values to produce a group value for a 5120-μs group time period and/or may sum any suitable number of such chunk values to produce a group value for a corresponding group time period of desired duration.

As illustrated by the examples above, data chunk grouping circuit 42 may generate group values for group time periods of various durations. Accordingly, monitoring system 36, or more specifically different monitors for different monitoring channels in failure detection circuit 44, may each monitor the performance of the light source across group time periods of a corresponding durations.

In particular, data chunk grouping circuit 42 may be coupled to failure detection circuit 44. Failure detection circuit 44 may obtain multiple group values for non-overlapping group time periods of the same duration to generate a rolling sum for a rolling monitoring time period containing each of the non-overlapping group time periods. Failure detection circuit 44 may also obtain a corresponding threshold level for each set of group values. Failure detection circuit 44 may compare the rolling sum to one or more the threshold levels and, based on the comparison, may determine whether a fault has occurred. As an example, when one or more threshold levels are exceeded by the rolling sum, failure detection circuit 44 may output a signal indicative of the failure or fault.

Failure detection circuit 44 may receive group values for different group time periods and may generate a corresponding rolling sum for group values of each of the different group time periods. As examples, failure detection circuit 44 may obtain a first rolling sum that adds group values for 200 1-μs group time period (thereby forming a rolling monitoring time window of 200 μs), a second rolling sum that adds group values for 200 10-μs group time periods (thereby forming a rolling monitoring time window of 2 ms (milliseconds)), a third rolling sum that adds group values for 200 80-μs group time period (thereby forming a rolling monitoring time window of 16 ms), a fourth rolling sum that adds group values for 200 320-μs group time period (thereby forming a rolling monitoring time window of 64 ms), a fifth rolling sum that adds group values for 200 640-μs group time period (thereby forming a rolling monitoring time window of 128 ms), a sixth rolling sum that adds group values for 200 2560-μs group time period (thereby forming a rolling monitoring time window of 512 ms), a seventh rolling sum that adds group values for 200 5120-μs group time period (thereby forming a rolling monitoring time window of 1024 ms), and/or any other suitable rolling sums. In such a manner, failure detection circuit 44 may include multiple (e.g., seven, in the above-mentioned example) monitors or monitoring channels for monitoring time windows of varying durations.

The number and/or duration of group time periods for each rolling sum as described in the above examples are merely illustrative. If desired, any suitable number and/or duration of group time periods may be used to generate any suitable number of rolling sums for monitoring. Failure detection circuit 44 may set and/or obtain different threshold levels for comparison with different rolling sums and/or may set and/or obtain the same threshold level for comparison with at least some (e.g., all) of the rolling sums.

If desired, system 36 may include a failure mitigation circuit coupled to one or more (e.g., all) of the outputs of failure detection circuit 44 and may perform one or more mitigation operations in response to a detected failure or fault. As examples, these mitigation operations may include deactivating one or more parts of illumination module 14 such as one or more failing light sources, portions of driver circuitry having a fault, and/or a clock generation circuit; adjusting a control signal provided to the light sources; outputting a notification to a user of illumination module 14; and/or other types of mitigation operations. Adjusting the control signal may include lowering light source output power or otherwise adjusting the operation of light sources to correct a detected failure or fault.

Figure 5:
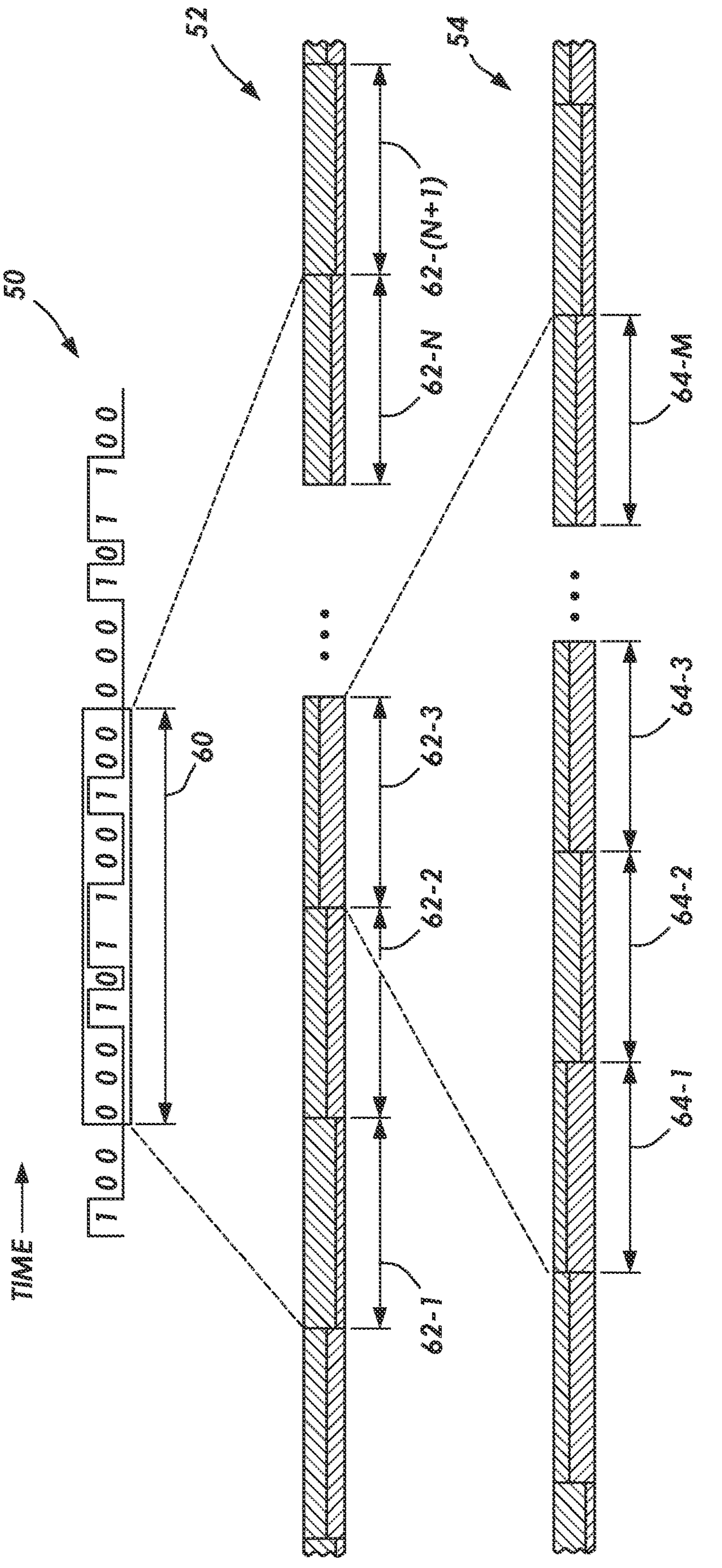
FIG. 5 is a diagram of illustrative sampling and monitoring of a light source signal based on groupings of data chunks in accordance with some embodiments.

FIG. 5 is a diagram of an illustrative set of samples in a light source signal represented as a number of groups each including a corresponding number of chunks. In the examples of FIG. 5, a signal such as the signal conveyed from driver circuitry 32 to a light source 30 in FIG. 3 may include a number of samples 50 obtained and detected by light monitoring system 36.

System 36 may obtain samples 50 in data groups 52, with each data group 52 further containing a number of data chunks 54. In particular, for each data chunk 54, system 36 may generate a count indicative of the number of times or the average number of times the signal is asserted or the light source is active during that chunk time period. For example, the sampled bitstream may have a value of 1 each time the signal is asserted or the light source is active. The number of times the bitstream has a value of 1 during the chunk time period may be averaged. For each data group 52, system 36 may generate a sum that adds the counts of each of the data chunks 54 included in that data group 52. For each observation or monitoring time period, system 36 may generate an additional sum that adds the sums for each of the data groups 52 in the observation or monitoring time window. The observation time window may be a rolling time period of fixed temporal length that is updated and monitored over time, and as such, the additional sum may be a rolling sum that is similarly updated over time.

In the example of FIG. 5, time period 60 may represent a monitoring time window monitored by system 36. Samples in time period 60 may be represented by data groups 62-1, 62-2, 62-3, . . . , 62-N. Each of data groups 62 may include a corresponding set of data chunks 64 each containing information about a non-overlapping subset of samples in time period 60.

Time period 60 may represent a monitoring time window at a particular instance in time. In other words, information from groups 62-1 to 62-N may be aggregated (e.g., summed) to generate a value for monitoring. For example, the generated value may be compared to one or more threshold levels indicative of one or more system faults. The time window monitored by system 36 may be a running or rolling time period that changes over time. Accordingly, at a subsequent instance in time, information from group 62-1 may be removed and information from group 62-(N+1) may be added such that the information from groups 62-2 to 62-N to generate a new value, such as a new sum of the rolling sum, for monitoring and comparison with the one or more threshold levels. In such a manner, a rolling time window that produces a rolling sum formed from a rolling set of groups 52 may be used to monitor the operation of the illumination module.

FIG. 5 shows one example of an illustrative monitor or monitoring channel in system 36, e.g., in failure detection circuit 44 in FIG. 4. To provide multiple monitors in detection circuit 44 that monitor performance across multiple observation time windows of various durations and/or with different granularities, system 36 may organize samples 50 into multiple differently-sized data chunks. The illustrative set of data chunks 54 in FIG. 5 may be of a first size, with each data chunk containing four samples. System 36 may additionally organize the same set of samples 50 into other sets of data chunks of a second size, a third size, a fourth size, and/or any other suitable sizes. Depending on the granularity and/or size of the time window to be monitored, system 36 may provide monitors (e.g., in failure detection circuit 44) that each monitor an observation time window with a different duration and/or a different granularity. Each of the different observation time windows may provide a value based on a different number of groups, with each of the groups aggregating chunk values from a different number of data chunks and/or data chunks of different sizes.

In other words, the duration of the monitoring time window such as monitoring time window 60, the number of groups 62, the number of data chunks 64, and/or the size of (e.g., the number of samples in) each of data chunks and/or each of data groups may be adjusted for system 36 to provide other monitors in addition to the monitor shown in the example of FIG. 5.

Figure 6:
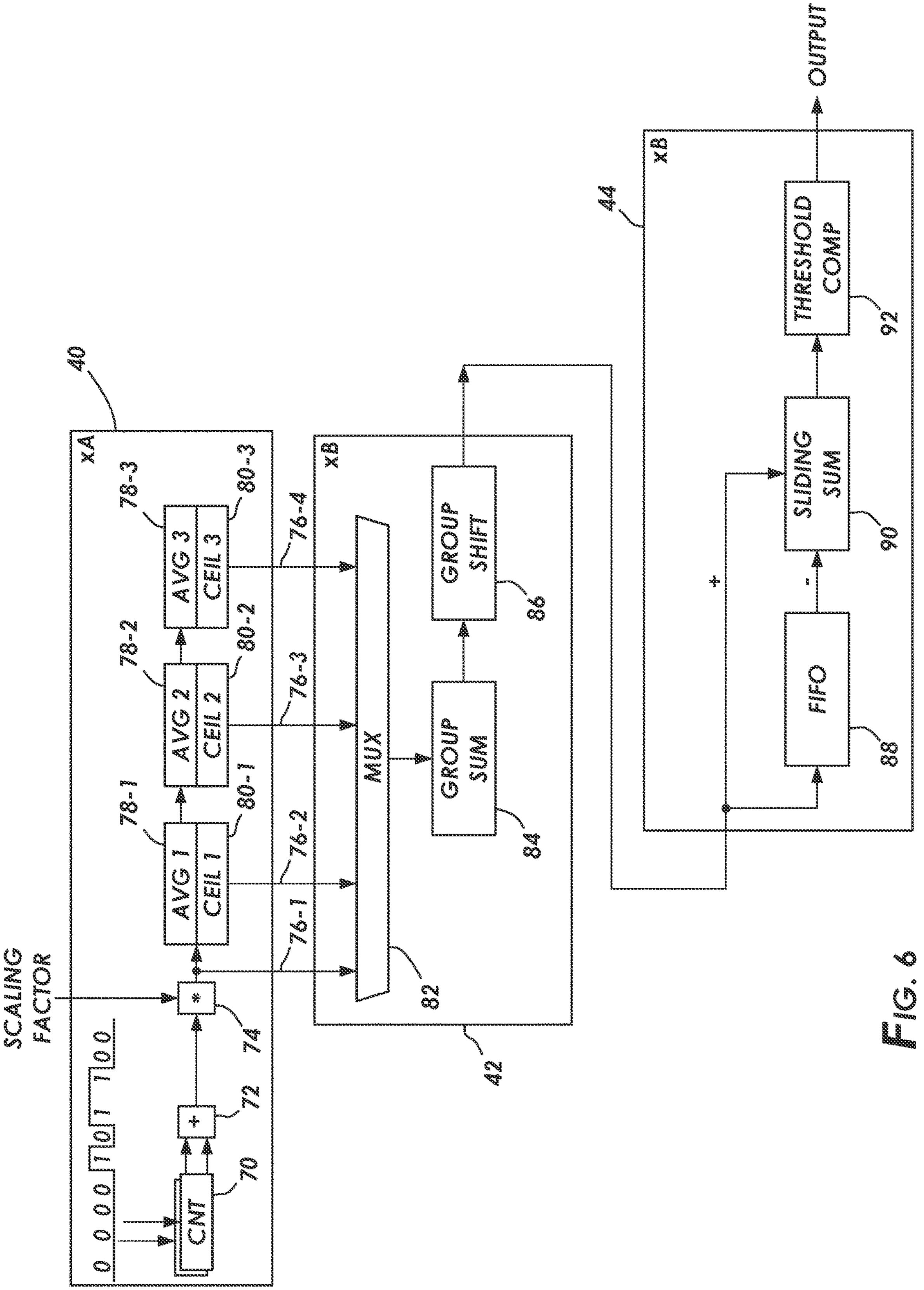
FIG. 6 is a diagram of illustrative circuitry for implementing a light source monitoring system in accordance with some embodiments.

FIG. 6 is a diagram of an illustrative implementation of a light source monitoring system such as light source monitoring system 36 in FIG. 4. As shown in the example of FIG. 6, data chunking circuit 40 may include one or more counter circuits 70, such as one or more digital counters, an adder circuit 72, a multiplier circuit 74, and a plurality of averaging circuits 78-1, 78-2, 78-3. There may be one counter circuit in the data chunking circuit 40 for each light source 30. Counter circuit 70 may detect and count each active state of the light source signal for a corresponding clock phase of the clock signal. The counter circuit 70 may then produce samples indicative of the number of active time periods of the light source across the clock phases of the clock signal. The counts produced by counter circuit 70 may be added together by adder circuit 72 for every set number of samples. The set number of samples may be four, or any other suitable number. The adder circuit 72 may then produce a count of the number of active time periods (e.g., the number of 1s in the bitstream) for every set number of periods of the light source signal.

If desired, the count produced by adder circuit 72 may be scaled at multiplier circuit 74 by an adjustable scaling factor. In some illustrative configurations described herein as an example, the modulation frequency of the light source signal may vary across time, leading to a varying number of samples across a fixed time period. A calculation circuit such as an arithmetic circuit may be coupled to clock generation circuit 34 in FIG. 3 and may generate the scaling factor based on the frequency of the clock signal produced by clock generation circuit 34. By scaling the number of samples, a count per time interval, rather than a count per set of samples, may be generated by multiplier circuit 74.

The resulting count output from multiplier circuit 74 may be provided along path 76-1 as the count value for a first data chunk or a data chunk of a first size (e.g., a data chunk value for 4 samples as determined by the number of samples added by adder circuit 72).

Additionally, over time, multiple resulting counts output by multiplier circuit 74 may also be conveyed to a first averaging circuit 78-1. First averaging circuit 78-1 may average the multiple resulting counts (e.g., eight or other suitable numbers of counts) output by multiplier circuit 74 over time. A ceiling function may be applied by ceiling circuit 80-1 to produce a resulting average count on path 76-2. This average count on path 76-2 may be for a second data chunk or a data chunk of a second size.

Additionally, over time, multiple resulting average counts output by averaging circuit 78-1 may also be conveyed to a second averaging circuit 78-2. Second averaging circuit 78-2 may average the multiple resulting average counts (e.g., eight or other suitable numbers of average counts) output by averaging circuit 78-1 over time. A ceiling function may be applied by ceiling circuit 80-2 to produce another resulting average count on path 76-3. This average count on path 76-3 may be for a third data chunk or a data chunk of a third size.

Additionally, over time, multiple resulting average counts output by averaging circuit 78-2 may also be conveyed to a third averaging circuit 78-3. Third averaging circuit 78-3 may average the multiple resulting average counts (e.g., eight or other suitable numbers of average counts) output by averaging circuit 78-2 over time. A ceiling function may be applied by ceiling circuit 80-3 to produce another resulting average count on path 76-4. This average count on path 76-4 may be for a fourth data chunk or a data chunk of a fourth size.

In general, any suitable number of averaging circuit 78 and corresponding ceiling circuits 80 may be provided to provide different data chunk values in parallel to the data chunk grouping circuit 42. These averaging circuit 78 may be coupled to counter 70. If desired, adder circuit 72 and multiplier circuit 74 may be coupled between these averaging circuits 78 and counter 70.

The data chunk grouping circuit 42 may include a multiplexer 82 and a summation circuit 84. A multiplexer such as multiplexer 82 may have inputs coupled to paths 76-1, 76-2, 76-3, and 76-4. The values conveyed on paths 76 may represent data chunk values of varying sizes that each contain information about a differing number of samples. The multiplexer may then select, based on a control signal received at multiplexer, one of the data chunk values on paths 76-1, 76-2, 76-3, and 76-4 to pass to an output of multiplexer 82.

A summation circuit 84 (sometimes referred to as a group summation circuit) may be coupled to the output of multiplexer 82. Summation circuit 84 may generate a group value (e.g., a group sum) using a series of data chunk values from one of the paths 76-1, 76-2, 76-3, or 76-4 produced over time. As an example, summation circuit 84 may perform the addition operation described in connection with FIG. 5 when summing or otherwise aggregating the values of data chunks 64-1, 64-2, . . . , 64-M to generate the group value for data group 62-3. Values for data chunks 64-1, 64-2, . . . , 64-M may all be provided on the same path 76 (e.g., path 76-2) because data chunks 64-1, 64-2, . . . , 64-M may be of the same size. In fact, when summing corresponding data chunk values to generate group values for other data groups 62 such as data groups 62-1, 62-2, 62-N, 62-(N+1), data chunk values from the same path 76 (e.g., path 76-2) may be used because each group 62 may aggregate data chunk values of the same size.

Each of these group values such as group values for groups 62 (FIG. 5) may be generated sequentially based on summing the desired series of data chunk values from the same path 76. As each group value is generated, summation circuit 84 may output the generated value to a memory or data storage circuit coupled to summation circuit 84 such as first-in-first-out (FIFO) memory circuit 88 in fault detection circuit 44 for storage. If desired, data chunk grouping circuit 42 may further include a group value shifting circuit 86 coupled between summation circuitry 84 and memory circuit 88. Value shifting circuit 86 may adjust the generated group value, or more specifically remove an excess portion of (e.g., fix or remove a certain number of bits from) the group value generated by summation circuit 84 to allow for standardized and compact storage at memory circuit 88.

Fault detection circuit 44 may include the memory circuit 88, a summation circuit 90, and a comparison circuit 92. Memory circuit 88 may be configured to store any suitable number of group values for a number of groups spanning a monitoring time window. Using FIG. 5 as an example, memory circuitry 88 may store N number of group values each corresponding to one of groups 62-1, 62-2, 62-3, . . . , 62-N.

Summation circuit 90 (sometimes referred to as a sliding summation circuit or generally an arithmetic circuit) may be configured to produce the rolling sum associated with the rolling monitoring time window. In particular, summation circuit 90 may obtain a current sum of the N group values for a current monitoring time period and provide the current sum to comparison or comparator circuit 92 in detection circuit 44. The current sum may be stored at the summation circuit 90. Comparison circuit 92 may compare the current sum with one or more threshold levels. Based on the comparison(s), detection circuit 44 may provide an output indicative of whether any faults are detected based on the current sum associated with the current monitoring time period.

For a subsequent sum in the set of rolling sums, summation circuit 90 may subtract the oldest group value from the current sum and add the newest group value in FIG. 5) to the current sum to obtain a subsequent sum. As shown in FIG. 5, group value of group 62-1 may be subtracted from the illustrated time period 60, and group value of group 62-(N+1) may be added to obtain the subsequent sum of the rolling time period. Summation circuit 90 may obtain the oldest group value from the first entry stored in FIFO memory 88 (and first to be removed) and may obtain the new group value directly from summation circuit 84 (through shifting circuit 85, if desired). This newly generated subsequent sum may be the new current sum and compared to one or more threshold levels at comparison circuit 92. This new current sum may be subsequently updated in an analogous manner to continue the generation of rolling sums.

While one set of grouping and detection components (i.e., multiplexer 82, group summation circuit 84, group value shifting circuit 86, FIFO memory circuit 88, sliding summation circuit 90, and threshold comparison circuit 92) is shown in connection with chunk grouping circuit 42 and detection circuit 44, this configuration is merely illustrative. As described above, monitoring system 36 may perform multiple monitoring operations using multiple monitors or monitoring channels in parallel, each for monitoring a different monitoring time window associated with a corresponding rolling sum value resulting from group values containing a different numbers of data chunk values. Accordingly, chunk grouping circuit 42 may include one or more additional sets of multiplexer 82, group summation circuit 84, and group value shifting circuit 86, and detection circuit 44 may include one or more additional sets of FIFO memory circuit 88, sliding summation circuit 90, and threshold comparison circuit 92 to form these additional monitors or monitoring channels.

If desired, at least some of these components in circuits 42 and 44 may be shared between components of the different monitoring channels. As examples, multiplexer 82 may have a shared output or multiple separate outputs coupled to multiple group summation circuits for different monitoring channels, a group summation circuit 84 may be used to calculate group values for different monitoring channels, group value shifting circuit 86 may be shared between group summation circuits for different monitoring channels, multiple FIFO memory circuits 88 may be implemented on different portions of a shared memory integrated circuit (e.g., an integrated circuit implementing a random access memory), and/or comparison circuit 92 may be shared between different monitoring channels.

In the example of FIG. 6, an illustrative configuration of data chunking circuit 40 having a counter 70, an adder circuit 72, a multiplier circuit 74, a plurality of averaging circuits 78, and a plurality of ceiling circuits 80 is shown for sampling and chunking samples for a single light source signal. If desired, one or more additional sets of counter 70, adder circuit 72, multiplier circuit 74, averaging circuits 78, and ceiling circuits 80 may be included as part of data chunking circuit 40 for sampling and chunking samples for one or more additional light source signals of corresponding light source(s) in parallel with the sampling and chunking samples of the first light source signal. The additional set(s) of counter 70, adder circuit 72, multiplier circuit 74, averaging circuits 78, and ceiling circuits 80 may similarly include corresponding monitoring channels implemented by portions of chunk grouping circuit 42 and detection circuit 44.

Various embodiments have been described illustrating a light source monitoring system.

As an example, an imaging system may include a sensor module having an image sensor pixel array and may include an illumination module having a light source, driver circuitry coupled to the light source, and a light source monitoring system coupled to the light source and configured to receive a light source signal. The light source monitoring system may include a data chunking circuit that produces a plurality of data chunk values based on samples from the light source signal, a grouping circuit that produces a plurality of group values each aggregating at least some of the plurality of data chunk values, and a failure detection circuit that produces an output signal indicative of a fault based on a monitoring time window characterized by at least some of the plurality of group values.

As another example, an illumination module may include a light source and a light source monitoring system coupled to the light source and configured to receive a light source signal. The light source monitoring system may include a counter configured to produce samples of the light source signal, a plurality of averaging circuits coupled to the counter, a multiplexer having a plurality of inputs coupled to the plurality of averaging circuit and having an output, a first summation circuit coupled to the output of the multiplexer, a memory circuit coupled to the first summation circuit, a second summation circuit coupled to the memory circuit and the first summation circuit, and a comparison circuit coupled to the second summation circuit.

As yet another example, a time-of-flight sensor comprises a sensor module having an image sensor pixel array, an illumination module having a light source, driver circuitry coupled to the light source, and a light source monitoring system coupled to the light source and configured to receive a drive signal provided from the driver circuitry to the light source. The light source monitoring system may include a first monitor configured to detect one or more faults using the drive signal and using a first observation time window having a first duration and a second monitor configured to detect the one or more faults using the drive signal and using a second observation time window having a second duration.

The foregoing is merely illustrative of the principles of this invention and various modifications can be made by those skilled in the art without departing from the scope and spirit of the invention. The foregoing embodiments may be implemented individually or in any combination.

What is claimed is:

1. An imaging system comprising:

a sensor module having an image sensor pixel array; and an illumination module having a light source, driver circuitry coupled to the light source, and a light source monitoring system coupled to the light source and configured to receive a light source signal, wherein the light source monitoring system comprises:

a data chunking circuit that produces a plurality of data chunk values based on samples from the light source signal;

a grouping circuit that produces a plurality of group values each aggregating at least some of the plurality of data chunk values; and a failure detection circuit that produces an output signal indicative of a fault based on a monitoring time window characterized by at least some of the plurality of group values.

2. The imaging system defined in claim 1, wherein the plurality of data chunk values each comprise information about multiple samples.

3. The imaging system defined in claim 2, wherein the information about multiple samples comprises times at which the light source signal is asserted.

4. The imaging system defined in claim 2, wherein the plurality of group values each comprise a sum of multiple data chunk values.

5. The imaging system defined in claim 4, wherein the failure detection circuit produces an additional sum for the monitoring time window that adds the at least some of the plurality of group values.

6. The imaging system defined in claim 5, wherein the failure detection circuit performs a comparison of the additional sum with one or more threshold levels and produces the output signal based on the comparison.

7. The imaging system defined in claim 6, wherein the monitoring time window is a rolling time window that changes over time and wherein the additional sum is a rolling sum that changes over time.

8. The imaging system defined in claim 1, wherein the failure detection circuit monitors the monitoring time window for a first monitoring channel of the light source signal and monitors one or more additional monitoring time windows for one or more additional monitoring channels of the light source signal.

9. The imaging system defined in claim 1, wherein the light source monitoring system is electrically connected to a path between the light source and the driver circuitry that conveys a drive signal from the driver circuitry to the light source and wherein the light source signal is the drive signal.

10. The imaging system defined in claim 1, wherein the light source monitoring system comprises a light detector and wherein the light source signal is based on light emitted by the light source and detected by the light detector.

11. An illumination module comprising:

a light source; and a light source monitoring system coupled to the light source and configured to receive a light source signal, wherein the light source monitoring system comprises:

a counter configured to produce samples of the light source signal;

a plurality of averaging circuits coupled to the counter;

a multiplexer having a plurality of inputs coupled to the plurality of averaging circuits and having an output;

a first summation circuit coupled to the output of the multiplexer;

a memory circuit coupled to the first summation circuit;

a second summation circuit coupled to the memory circuit and the first summation circuit; and a comparison circuit coupled to the second summation circuit.

12. The illumination module defined in claim 11, wherein a given averaging circuit of the plurality of averaging circuits produces a set of average values over time and wherein the first summation circuit produces a set of group values over time based on the set of average values.

13. The illumination module defined in claim 12, wherein the memory circuit stores the set of group values, and wherein the second summation circuit produces a rolling sum over time based on the set of group values.

14. The illumination module defined in claim 11 further comprising:

an adder circuit; and a multiplier circuit, wherein the adder circuit and the multiplier circuit are coupled between the counter and the plurality of averaging circuits.

15. The illumination module defined in claim 14 further comprising:

a plurality of ceiling circuits that perform a ceiling function on outputs of the plurality of averaging circuits and that are coupled between the plurality of averaging circuits and the multiplexer.

16. The illumination module defined in claim 15 further comprising:

a group value shifting circuit that changes a number of bits of an output of the first summation circuit and that is coupled between the first summation circuit and the memory circuit.

17. A time-of-flight sensor comprising:

a sensor module having an image sensor pixel array; and an illumination module having a light source, driver circuitry coupled to the light source, and a light source monitoring system coupled to the light source and configured to receive a drive signal provided from the driver circuitry to the light source, wherein the light source monitoring system comprise:

a first monitor configured to detect one or more faults using the drive signal and using a first observation time window having a first duration; and a second monitor configured to detect the one or more faults using the drive signal and using a second observation time window having a second duration.

18. The time-of-flight sensor defined in claim 17, wherein the first monitor produces a first value for the first observation time window based on a first set of average values aggregated from samples of the drive signal and wherein the second monitor produces a second value for the second observation time window based on a second set of averages values aggregated from the samples of the drive signal.

19. The time-of-flight sensor defined in claim 18, wherein the first set of average values has average values that each contain information about a first number of samples and wherein the second set of average values has average values that each contain information about a second number of samples greater than the first number of samples.

20. The time-of-flight sensor defined in claim 18, wherein the second set of average values has a greater number of average values than the first set of average values.

* * * * *